Nov. 16, 1971  G. L. WILDE  3,620,009
GAS TURBINE POWER PLANT
Filed Dec. 2, 1969
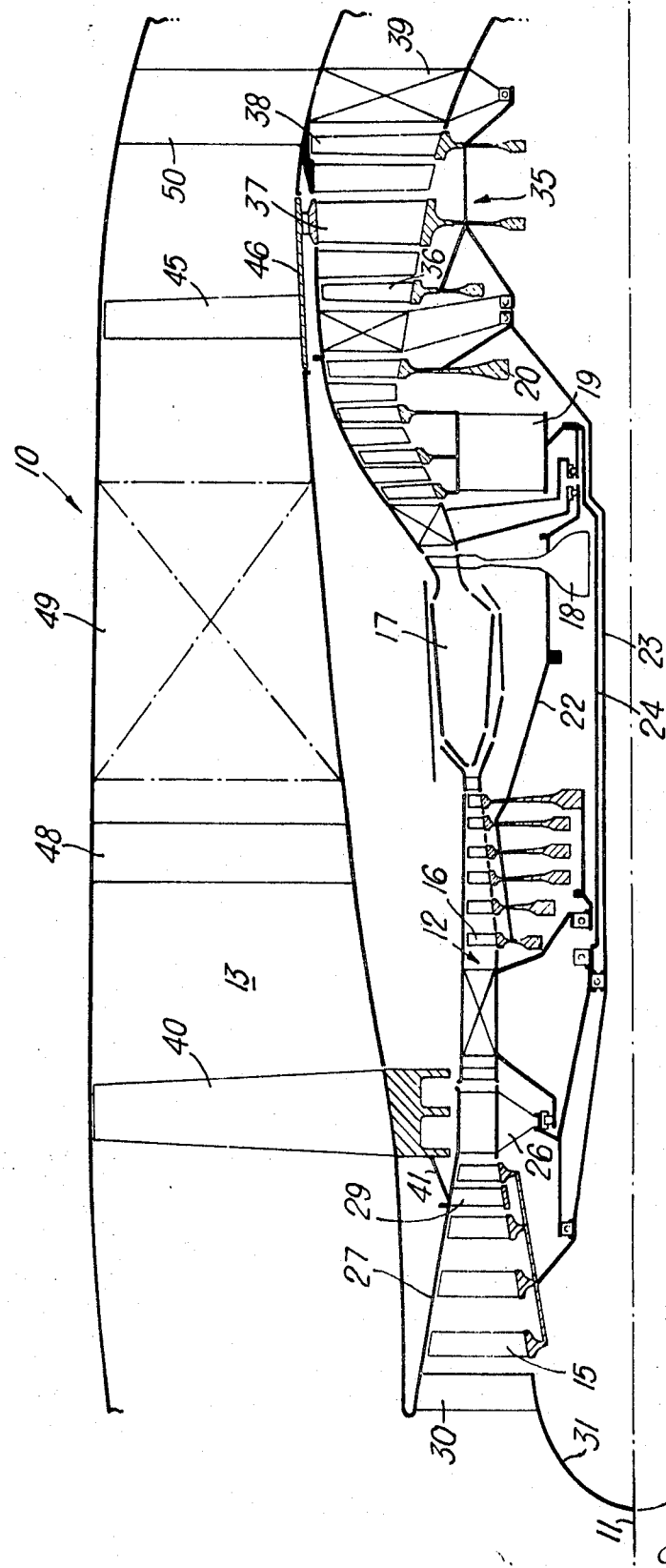
Inventor
GEOFFREY LIGHT WILDE
By
Cushman, Darby
Cushman   Attorneys 3,620,009
GAS TURBINE POWER PLANT
Geoffrey Light Wilde, Derby, England, assignor to
Rolls-Royce Limited, Derby, England
Filed Dec. 2, 1969, Ser. No. 881,374
Claims priority, application Great Britain, Dec. 4, 1968,
57,599/68
Int. Cl. F02c; F02k
U.S. Cl. 60—39.16 R                9 Claims

ABSTRACT OF THE DISCLOSURE

A turbo-fan power plant is disclosed in which there are two independent fans in the fan duct respectively driven by a gas generator and an independent free turbine. The gas generator includes in axial flow series low, intermediate and high pressure compressors respectively drivingly interconnected with high, intermediate and low pressure turbines, the intermediate pressure turbine being drivingly connected to the upstream or front fan of the two fans. The drive arrangement of the fans and their axial spacing enables them to rotate at relatively low speeds and substantially without any wake interaction therebetween, whereby the overall noise of the power plant is reduced.

---

This invention relates to gas turbine power plants, and more specifically it concerns a power plant of the turbo-fan type in which a fan is driven by a turbine which in turn is driven from the exhaust gases of a gas generator.

The present invention is an improvement of the arrangement disclosed in the co-pending United States application Ser. No. 795,269, filed Jan. 30, 1969, by Geoffrey Light Wilde and having the same assignee, Rolls-Royce Limited, Derby, England, now U.S. Pat. No. 3,534,556, dated Oct. 20, 1970.

According to the present invention in its broadest aspect, there is provided a gas turbine power plant including a gas generator flow duct in which are located, in axial flow series, a gas generator and a free turbine means, and a fan duct which at least partly surrounds the said gas generator flow duct and in which are located two fans axially spaced apart so that in operation substantially no wake interaction occurs therebetween, the upstream or front fan being drivingly connected to the intermediate pressure turbine of the gas generator while the downstream fan is drivingly connected to the said free turbine means.

Preferably said gas generator includes, in axial flow series, compressors of, respectively, low, intermediate and high pressure, each said compressor being drivingly connected to respective independent turbine means.

The driving connection between the intermediate pressure turbine and the upstream fan may include a shaft, located inwardly of the gas generator flow duct, on which is secured a ring of rotatable blades extending into and connected to the outer wall of the gas generator flow duct, said outer wall being connected for rotation with said upstream fan.

In a preferred embodiment of the present invention, the said outer wall carries at least two further rings of rotatable blades located in said gas generator flow duct, one of said further rings being upstream of the upstream-most stage of the low pressure compressor and being secured to the inner wall of said gas generator flow duct for rotation therewith.

Each said fan may be a single-stage fan, and preferably the fan duct is unobstructed by a stator stage upstream of the upstream fan.

A ring of stators may be mounted in the fan duct between the two fans.

Preferably the stators are arranged to carry the load between the fan casing which defines the said fan duct and the main casing which defines the said gas generator flow duct.

The said fan casing may be a monocoque structure. This enables the fan casing to be connected directly to aircraft structure when the power plant of the present invention is installed in an aircraft.

A ring of outlet guide vanes may be arranged downstream of the aft fan, the vanes being formed to constitute a nozzle for the fan duct.

The free turbine means is preferably a three-stage turbine, one of said stages being connected at its outer end with a rotatable part of the inner wall of the fan duct, on which part is mounted the aft fan for rotation therewith.

The invention will be described, merely by way of example, with reference to the accompanying drawing, which is a longitudinal section of one half of a gas turbine power plant in accordance with the present invention.

Referring to the drawing, there is shown a gas turbine power plant 10 having a longitudinal centre line of symmetry 11 which is also the axis of rotation of the rotary parts of the power plant 10.

The power plant 10 has two annular, substantially concentric flow ducts, namely a gas generator flow duct 12 and a fan duct 13 which surrounds the gas generator flow duct 12. These two ducts 12 and 13 are defined between the appropriate outer and inner walls of the gas generator flow casing and the fan casing respectively.

In the main flow duct 12 are mounted, in axial flow series, a four-stage low pressure compressor 15, a six-stage high pressure compressor 16, combustion equipment 17, a single-stage high pressure turbine 18, a three-stage intermediate pressure turbine 19 and a single-stage low pressure turbine 20.

The high pressure turbine 18 is drivingly connected to the high pressure compressor 16 by means of shafting 22, and the low pressure turbine 20 is drivingly connected with the low pressure compressor 15 by means of shafting 23 which is concentric with, and is located within shafting 22. The intermediate pressure turbine 19 is connected by means of shaft 24, which is located concentrically of and radially between shafting 23 and 22, with a ring of blades 26 located in the gas generator flow duct 12 just downstream of the final stage of the low pressure compressor 15.

The outer end of the ring of blades 26 is integral with that portion of the outer wall of the fan duct 12 which extends in an upstream direction therefrom. This wall 27 has secured thereto a ring of blades 29 which is located axially between the third and fourth stages of the low pressure compressor 15, and is provided with a further ring of blades 30 located upstream of the upstream-most stage of the low pressure compressor 15. The inner end of the ring 30 is connected to a portion 31 of the inner wall of the gas generator flow duct 12 for rotation therewith. The rings 30, 29 and 26 are arranged to do work on the air ingested and thus act, in a sense, as an intermediate pressure compressor.

Downstream of the low pressure turbine 20 there is provided a free turbine 35 having three rotor stages 36, 37 and 38. Downstream of the rotor stage 38 a ring of outlet guide vanes 39 is located from which the exhaust gases pass in operation to an exhaust duct and nozzle (not shown).

The fan duct 13 has mounted therein an upstream single-stage fan 40 which receives drive from an obliquely extending shaft or strut 41 connected between the outer end of the ring 29 and the inner end of the fan 40. It will be noted that the fan 40 is radially aligned with the ring of blades 26 and is thus well downstream of the upstream edge of the fan duct 13. Moreover, no stators or inlet guide vanes are provided upstream of the fan stage 40, this feature having a beneficial effect on noise reduction from the fan duct 13, as discussed below.

The fan duct 13 has mounted therein a second single-stage fan 45 which receives its drive from the rotor stage 37 of the free turbine 35, the drive connection being arranged by connecting the outer end of the ring 37 to a portion 46 of the inner wall of the fan duct 13 for rotation therewith, and securing the blades of the fan stage 45 to the wall portion 46.

As will be seen, the fan stage 45 is located axially aft of the low pressure turbine 20 and is approximately aligned radially with the upstream stage 36 of the free turbine 35. Thus the two single-stage fans 40, 45 are very substantially spaced apart axially, and this spacing is such that in operation no wake interaction will take place therebetween, as will be discussed in more detail below.

A ring of struts 43 extends between the inner and outer wall of the fan duct 13, and downstream of this ring 48 there is a further ring of stators 49. The stators in the ring 49 are helical stators arranged to leave some whirl in the air leaving the upstream fan 40. Moreover, means (not shown) may be provided to perform boundary layer suction at the respective trailing edges of the stators 49 to suppress, or reduce their wakes. The rings 48 and 49 are arranged to constitute load carrying structure between the fan casing and the main engine casing. Moreover, to enable the loads to be satisfactorily shared among the stators, the fan casing is made as a monocoque and may be connected directly to aircraft structure.

Downstream of the aft fan 45 a ring of outlet guide vanes 50 is provided, and the outlet guide vanes 50 may be arranged to embody a nozzle structure for the fan duct 13.

Having described the structure of the power plant according to the present invention, it is desired to point out a number of advantages afforded by this structure from the point of view of efficiency and low noise.

Thus, it will be noted that each fan is driven by a multi-stage turbine to help the rotational speed of the fan to be kept relatively low so as to keep the fan tip speeds at an acceptable level for high efficiency. The use of four separate drive shafts enables compressor and fan efficiencies to be maximised by allowing these components to rotate independently of each other at their respective optimum speeds.

The power plant of the present invention is designed to have a high by-pass ratio, for example in the range of 2–6, and for such engines the noise from the fan or fans becomes a significant proportion of the total. It has been found that the use of single-stage fans without inlet guide vanes gives a significant decrease in the overall fan noise. Nevertheless, if only one single stage fan were provided, the necessary overall pressure ratio requires a relatively high fan rotational speed with consequent relatively high noise.

However, in the present invention the compression is performed by two spaced apart fan stages. If these stages were located close to each other, though some noise reduction would be achieved by reduction of the rotational speed compared with a single stage arrangement, the overall noise would be increased owing to the high noise generated by interaction between the wakes of successive rotating stages. However, by spacing the fan stages 40 and 45 sufficiently far apart, interaction between the wakes is substantially reduced, and thus the overall noise of the fan is also substantially reduced.

In addition, in one single stage fan arrangements the hub or root of the fan rotates relatively slowly compared with its tip, which necessitates the use of a highly arcuate or twisted blade at the hub. However, this highly arcuate section is found to be a source of increased noise because it increases the relative velocity of the air and the blade at that part thereof.

The use of a two-stage fan substantially eliminates this drawback, since it allows the tip/root speed ratio to be reduced, thus further contributing to the overall noise reduction of the power plant.

Struts or guide vanes must, of course, be provided to support the fan duct, but by locating these at an appropriate distance downstream of the respective fan stages, any noise due to the interaction of wakes between rotary and stationary stages are considerably reduced in importance.

I claim:

1. A gas turbine power plant comprising: a gas generator flow duct; a gas generator and a free turbine means located in axial flow series in the gas generator flow duct, said gas generator including in axial flow series low, intermediate and high pressure compressors respectively drivingly connected to high, intermediate and low pressure turbines; a fan duct which at least partially surrounds the said gas generator flow duct; and two fans located in axially spaced apart upstream and downstream relationship in said fan duct so that in operation, the occurrence of wake interaction therebetween is substantially prevented, the upstream one of said fans being drivingly connected to said intermediate pressure turbine of said gas generator while the downstream one of said fans is drivingly connected to said free turbine means.

2. A power plant as claimed in claim 1 wherein the driving connection between the intermediate pressure turbine and the upstream fan includes a shaft, located inwardly of the gas generator flow duct, a ring of rotatable blades secured to the gas generator flow duct, said ring extending into and being connected to the outer wall of the gas generator flow duct, said outer wall being connected for rotation with said upstream fan.

3. A power plant as claimed in claim 2 wherein the said outer wall carries at least two further rings of rotatable blades located in said gas generator flow duct, one of said further rings being upstream of the upstream-most stage of the low pressure compressor and being secured to the inner wall of said gas generator flow duct for rotation therewith.

4. A power plant as claimed in claim 1 wherein each said fan is a single-stage fan.

5. A power plant as claimed in claim 1 wherein the fan duct is unobstructed by a stator stage upstream of the upstream fan.

6. A power plant as claimed in claim 1 wherein a ring of stators is mounted in the fan duct between the two fans.

7. A power plant as claimed in claim 6 wherein the stators are arranged to carry the load between the fan casing which defines the said fan duct and the main casing which defines the said gas generator flow duct.

8. A power plant as claimed in claim 1 wherein a ring of outlet guide vanes is arranged downstream of the aft fan, the vanes being formed to constitute a nozzle for the fan duct.

9. A power plant as claimed in claim 1 wherein the free turbine means is a three-stage turbine, and there is a rotatable part of the inner wall of the fan duct with which the outer end of one of said stages is connected, the aft fan being mounted on and for rotation with the said part.

References Cited
UNITED STATES PATENTS

| | | | |
|---|---|---|---|
| 3,316,717 | 5/1967 | Castle | 60—226 |
| 3,363,419 | 1/1968 | Wilde | 60—226 |
| 3,448,582 | 6/1969 | Bracey | 60—226 |

FOREIGN PATENTS

| | | | |
|---|---|---|---|
| 920,253 | 3/1963 | Great Britain | 60—226 |

DOUGLAS HART, Primary Examiner

U.S. Cl. X.R.

60—226 R